United States Patent
Farnes et al.

(10) Patent No.: US 9,382,015 B2
(45) Date of Patent: Jul. 5, 2016

(54) SINGLE AISLE MOUNT

(71) Applicant: Rosemount Aerospace, Inc., Burnsville, MN (US)

(72) Inventors: Brian Farnes, Richfield, MN (US); Matthew Tschann, Burnsville, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 165 days.

(21) Appl. No.: 14/156,716

(22) Filed: Jan. 16, 2014

(65) Prior Publication Data
US 2015/0197344 A1    Jul. 16, 2015

(51) Int. Cl.
| B64D 45/00 | (2006.01) |
| F16M 11/10 | (2006.01) |
| F16M 11/20 | (2006.01) |
| F16M 13/00 | (2006.01) |
| F16M 13/02 | (2006.01) |

(52) U.S. Cl.
CPC ............ *B64D 45/00* (2013.01); *F16M 11/105* (2013.01); *F16M 11/2021* (2013.01); *F16M 13/00* (2013.01); *F16M 13/02* (2013.01); *B64D 2045/0075* (2013.01); *Y10T 29/49826* (2015.01)

(58) Field of Classification Search
CPC ............... B64D 2045/0075; B64D 11/0007; B64D 2700/62166; B64D 45/00; B60R 7/04; B60R 7/05–7/06; B60R 11/0252; B60R 11/0258; B60R 11/0294; B60R 2011/008; B60R 2011/0085; F16M 2200/022; F16M 13/02
USPC ............... 224/547, 548, 553, 929; 248/274.1, 248/276.1, 284.1, 220.21, 220.22, 221.11, 248/224.8, 223.31
See application file for complete search history.

(56) References Cited

U.S. PATENT DOCUMENTS

| 4,470,106 | A  | * | 9/1984 | Norton ................... F16M 11/10 248/278.1 |
| 5,109,411 | A  | * | 4/1992 | O'Connell ..................... 379/454 |
| 5,201,896 | A  | * | 4/1993 | Kruszewski ........... F16M 11/10 248/278.1 |
| 6,264,152 | B1 | * | 7/2001 | Bloch .................... F16M 11/12 248/274.1 |
| 6,484,987 | B2 | * | 11/2002 | Weaver .................. F16M 11/10 248/278.1 |
| 7,303,171 | B1 |   | 12/2007 | Chen |
| 7,334,956 | B2 | * | 2/2008 | Taylor .................. B63B 35/815 114/361 |
| 7,954,777 | B2 | * | 6/2011 | Bohm .................... F16M 11/10 248/274.1 |
| 8,186,893 | B1 |   | 5/2012 | Patterson et al. |
| 8,282,059 | B2 | * | 10/2012 | Monaco ..................... 248/284.1 |
| 8,960,632 | B2 | * | 2/2015 | Fallows ............ F16M 11/2092 248/276.1 |
| 2007/0278371 | A1 | * | 12/2007 | Wang ........................ 248/309.3 |

(Continued)

FOREIGN PATENT DOCUMENTS

DE        202005000768        3/2005

OTHER PUBLICATIONS

Extended European Search Report dated Jun. 17, 2015 in European Application No. 15150986.6.

*Primary Examiner* — Corey Skurdal
(74) *Attorney, Agent, or Firm* — Snell & Wilmer LLP (57) ABSTRACT

A single aisle mount system is disclosed. A single aisle mount system may have a device mount, an articulating base having an articulation guide and a joiner member, and a structural support. The joiner member may retain a device mount in mechanical communication with an articulating base and the articulating base may facilitate positioning of a device mount. An electronic device may be mounted on the device mount. In this manner, a single aisle mount system may facilitate easier use and viewing of an electronic device.

13 Claims, 6 Drawing Sheets

(56) References Cited

U.S. PATENT DOCUMENTS

| | | |
|---|---|---|
| 2008/0296454 A1 | 12/2008 | Carnevali |
| 2009/0250578 A1* | 10/2009 | Stacchiotti ............. F16M 11/08 248/284.1 |
| 2011/0006170 A1 | 1/2011 | Liu et al. |
| 2011/0031373 A1* | 2/2011 | Fortes et al. .................. 248/600 |
| 2011/0278415 A1* | 11/2011 | Debuhr et al. ................ 248/313 |
| 2012/0085713 A1* | 4/2012 | Bowser et al. .................. 211/26 |
| 2012/0261520 A1* | 10/2012 | Groomes et al. .............. 244/234 |
| 2013/0126685 A1* | 5/2013 | Lucas et al. ................ 248/205.1 |
| 2013/0240700 A1* | 9/2013 | Huang ....................... 248/284.1 |
| 2014/0124553 A1* | 5/2014 | Cruz ............................ 224/409 |

* cited by examiner

SINGLE AISLE MOUNT

FIELD

The present disclosure relates to mounting systems for electronic devices, and more specifically, to adjustable mounting systems for electronic devices for use in vehicles.

BACKGROUND

Many vehicle operators increasingly utilize portable electronic devices. For example, many pilots utilize tablets, or Electronic Flight Bags rather than paper approach plates or aeronautical charts. Traditionally, paper charts are secured via a clipboard. With the advent of tablets and Electronic Flight Bags, apparatuses for securing the electronic devices are needed.

SUMMARY

In various embodiments, a single aisle mount system has a device mount adapted to mechanically interface with an electronic device, a structural support adapted to mechanically interface with an aircraft cockpit window ledge, and an articulating base disposed between the device mount and the structural support having an axis member, wherein the axis member provides an axis of rotation, wherein the articulating base retains the device mount in mechanical communication with the structural support and permits rotation of the device mount about the axis of rotation.

In various embodiments, a single aisle mount system has a device mount adapted to mechanically interface with an electronic device, a structural support adapted to mechanically interface with an aircraft cockpit window ledge, and an articulating base disposed between the device mount and the structural support having an axis member, wherein the axis member provides an axis of rotation, wherein the articulating base retains the device mount in mechanical communication with the structural support and permits rotation of the device mount about the axis of rotation, and wherein the articulating base has a base plate comprising a bent piece having two parallel flanges, wherein each flange has an aperture through which the axis member extends, a joiner member adapted to detachably retain the device mount in mechanical communication with the articulating base, an articulation guide adapted to guide the articulation of the device mount about the axis of rotation, and a tightening system adapted to exert a dampening force to prevent unwanted articulation of the device mount about the axis of rotation.

In various embodiments, a method of assembling a single aisle mount system includes joining an articulating base having an affixment apparatus and an articulation guide having a pin aperture and blind fitting tabs in mechanical communication with a structural support having a base mount, wherein the joining includes inserting a fastener between the base mount and the affixment apparatus, placing the device mount atop the articulating base wherein the device mount is guided into position with respect to the articulating base by the blind fitting tabs, joining the device mount to the articulating base by inserting a pin through the pin aperture and the pin acceptance aperture, orienting the single aisle mount system via annular rotation of the articulation guide about an axis member, and tightening a tightening system whereby the further annular rotation of the articulation guide about the axis member is prevented.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

In various embodiments, a single aisle mount system may comprise a device mount, an articulating base, and a structural support. For example, with reference to FIGS. 1 and 2, structural support 500 may mechanically interface with a cockpit structure, for example, an aircraft cockpit window ledge. An articulating base 300 may mechanically interface with structural support 500. A device mount 200 may mechanically interface with articulating base 300. In various embodiments, articulating base 300 comprises a joiner member 350. In various embodiments, joiner member 350 detachably retains device mount 200 in mechanical communication with articulating base 300. In various embodiments, device mount 200 may affix in mechanical communication with a device, for example, with an Electronic Flight Bag or a tablet device.

Figure 1:
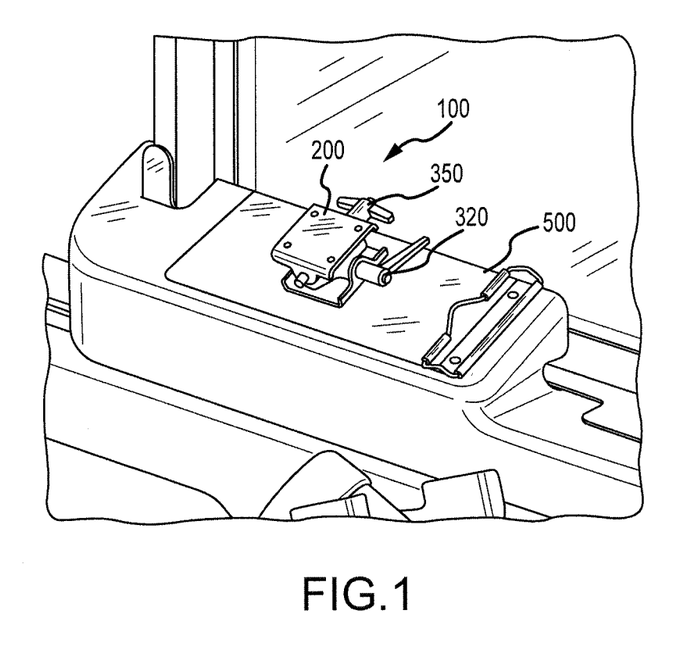
FIG. 1 illustrates a single aisle mount system installed in an aircraft cockpit in accordance with various embodiments.
Figure 3:
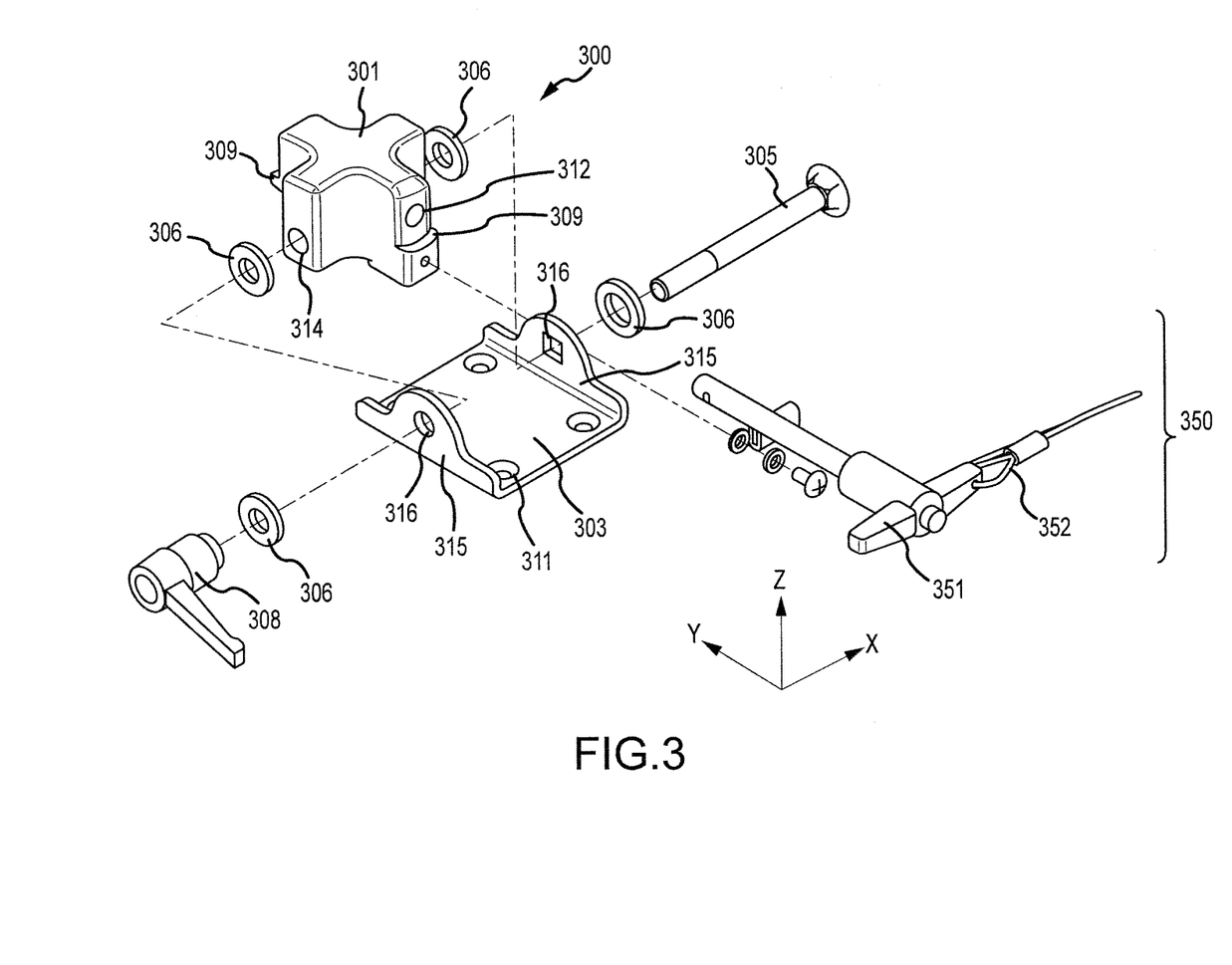
FIG. 3 is an exploded view illustrating various aspects of a single aisle mount system according to various embodiments.
Figure 4:
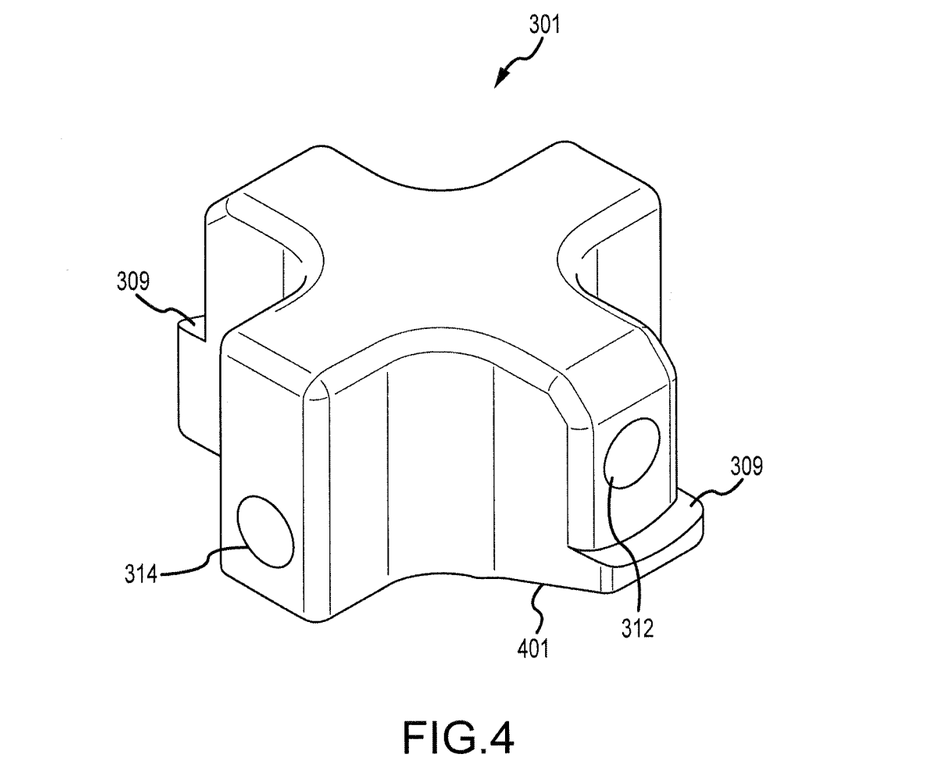
FIG. 4 illustrates various aspects of an articulation guide member of a single aisle mount system according to various embodiments.

With reference to FIGS. 1, 3, and 4, in various embodiments, an articulating base 300 comprises a base plate 303, an axis member 305, a tightening system 320, a joiner member 350, and an articulation guide 301. For example, base plate 303 may comprise a piece of sheet metal having bent flanges 315. In various embodiments, the base plate 303 comprises two parallel bent flanges 315. Each bent flange 315 may have an aperture 316 to accept an axis member 305. Moreover, base plate 303 may comprise at least one affixment apparatus 311 whereby base plate 303 may mechanically interface with structural support 500. In various embodiments, affixment apparatus 311 comprises a mounting hole for the insertion of a fastener. The bent flanges 315 may comprise apertures 316 alignable with a corresponding axis aperture 314 in an articulation guide 301. Thus, axis articulation guide 301 may be positioned between the bent flanges 315 of base plate 303 and axis member 305 may be inserted through the corresponding axis aperture 314, thereby retaining articulation guide 301 in a fixed translational position relative to base plate 303 in the X-Y plane, yet permitting articulation guide 301 to pivot annularly about an axis provided by axis member 305 and axis aperture 314. In various embodiments, axis member 305 comprises a carriage bolt. Moreover, aperture 316 may comprise a shape adapted to interface with axis member 305 whereby axis member 305 is prevented from unwanted movement, for example, rotation. For example, aperture 316 may be square in shape and may receive a portion of axis member 305, for example, a portion of the head of a carriage bolt.

Figure 2:
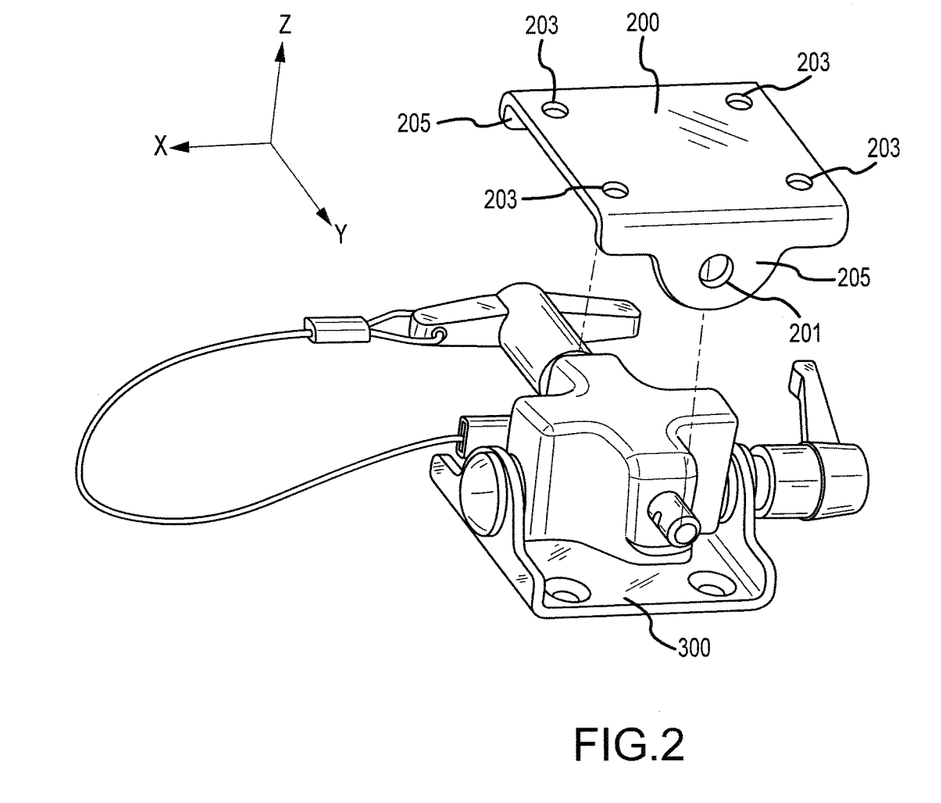
FIG. 2 illustrates various aspects of a single aisle mount system according to various embodiments.

With reference to FIGS. 1-3, a joiner member 350 may comprise a pin 351 and a lanyard 352. For example, a pin 351 may pass through a pin aperture 312 in the articulation guide 301. In this manner, other apparatuses having corresponding apertures, for example, a device mount 200 may be detachably retained in mechanical communication with articulating base 300. In various embodiments, pin aperture 312 extends through articulation guide 301 at a right angle to axis member 305. A lanyard 352 may extend between pin 351 and articulating base 300 whereby pin 351 is prevented from becoming separated from the single aisle mount system 100.

With continuing reference to FIG. 3, a tightening system 320 (with momentary reference to FIG. 1) may be adapted to exert a dampening force to prevent unwanted articulation of the articulation guide 301 (and device mount 200) about the axis of rotation provided by axis member 305. A tightening system may comprise a plurality of washers 306 and a handle 308. A washer 306 may be placed between each structure through which axis member 305 extends. For example, a washer 306 may surround axis member 305 between the head of axis member 305 and a flange of base plate 303. A washer 306 may surround axis member 305 on each side of articulation guide 301 between a flange of base plate 303 and articulation guide 301. Another washer 306 may surround axis member 305 between a bent flange 315 of base plate 303 and handle 308. In various embodiments, handle 308 may comprise threading adapted to fit on the threads of the carriage bolt comprising axis member 305. In this manner, handle 308 may be tightened on the threads of a carriage bolt comprising axis member 305, frictionally compressing the flanges of base plate 303, the washers 306 and the articulation guide 301. As a result, articulation guide 301 may be pivoted annularly about the axis provided by axis member 305 and then handle 308 may be tightened, to fix articulation guide 301 in static orientation.

With reference to FIGS. 2-4, an articulation guide 301 may comprise an axis aperture 314, a pin aperture 312, an angle stop 401, and blind fitting tabs 309. In various embodiments, blind fitting tabs 309 constrain the positioning of device mount 200, thereby facilitating the joining of device mount 200 and articulating base 300 by joiner member 350, without requiring the user to visually observe the joiner member 350 in order to properly align pin aperture 312 in relation to device mount 200. As discussed herein, axis aperture 314 accepts axis member 305 and retains articulation guide 301 in a fixed translational position relative to base plate 303 in the X-Y plane, yet permits articulation guide 301 to pivot annularly about an axis provided by axis member 305 and axis aperture 314. As also discussed herein, pin aperture 312 in the articulation guide 301 may permit a pin 351 to pass through articulation guide 301. In this manner, other apparatuses having corresponding apertures, for example, a device mount 200 may be detachably retained in mechanical communication with the articulation guide 301 via pin 351. In various embodiments, pin aperture 312 extends through articulation guide 301 at a right angle to axis member 305.

In various embodiments, angle stop 401 comprises a surface of articulation guide 301 that contacts the base plate 303 to limit the degree of annular rotation that articulation guide 301 traverses about the axis member 305. In various embodiments, angle stop 401 is formed to permit 20 degrees of travel beyond a line parallel to the plane of the surface of base plate 303, although angle stop 401 may be formed to permit any degree of travel.

Now, having described various embodiments of an articulating base 300, a single aisle mount system 100 may also comprise a device mount. In various embodiments, with reference to FIGS. 1 and 2, a device mount 200 may comprise a piece of sheet metal having bent flanges 205. A device mount 200 may be detachably retained in mechanical communication with articulating base 300. For example, each bent flange 205 may have a pin acceptance aperture 201 to accept a pin 351.

Thus, a device mount 200 may be positioned atop articulating base 300 so that blind fitting tabs 309 of articulation guide 301 facilitate the alignment of pin aperture 312 and pin acceptance aperture 201 so that pin 351 may be inserted through the pin apertures 312 and pin acceptance apertures 201. Thus, device mount 200 may be retained in a mechanical communication with articulating base 300.

In various embodiments, a device mount 200 may also comprise at least one device affixment interface 203. In various embodiments, a device mount 200 may comprise four device affixment interfaces 203, or any number of device affixment interfaces 203 whereby device mount 200 may mechanically interface with a device. In various embodiments, device affixment interface 203 comprises an aperture for the insertion of a fastener.

Figure 6:
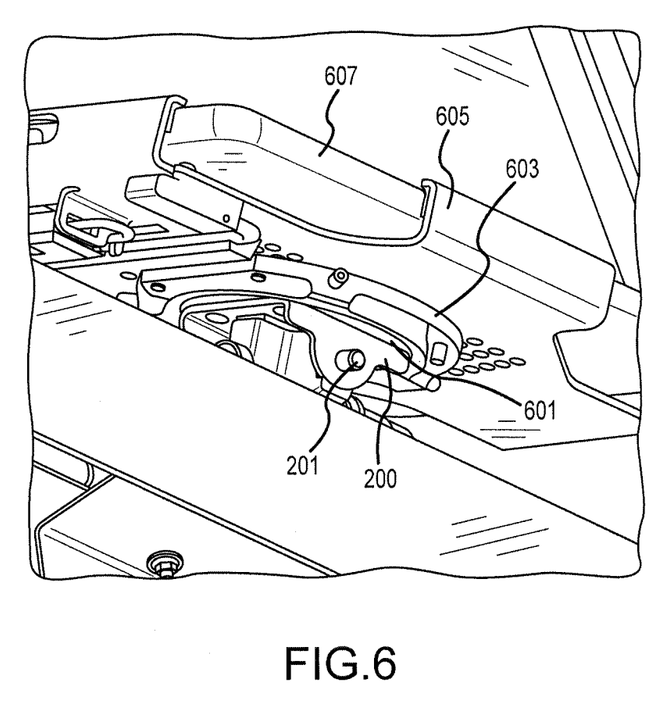
FIG. 6 illustrates various aspects of a single aisle mount system having rotation features according to various embodiments.

A device, such as an electronic device, may mount directly to a device mount 200, for example, via a fastener inserted through device affixment interface 203. In various embodiments, a device does not mount directly to a device mount 200, but rests in a cradle 605 (with momentary reference to FIG. 6) which mounts directly to a device mount 200, for example, via fasteners inserted through device affixment interface 203.

In various embodiments, the device mount 200 also comprises a rotation structure. In various embodiments, a rotation structure comprises an upper rotation plate and a lower rotation plate held rotatably in mechanical communication by a bearing and/or a bushing. For example, with reference to FIG. 6, a lower rotation plate 601 may affix directly to device mount 200, for example, via fasteners inserted through device affixment interface 203. An upper rotation plate 603 may be held rotatably in mechanical communication with lower rotation plate 601, for example, by a bearing and/or a bushing. Moreover, upper rotation plate 603 may be held in mechanical communication with a cradle 605. An electronic device 607 may rest in mechanical communication with cradle 605. In this regard, an electronic device 607 may be retained by a single aisle mount system 100.

Figure 5:
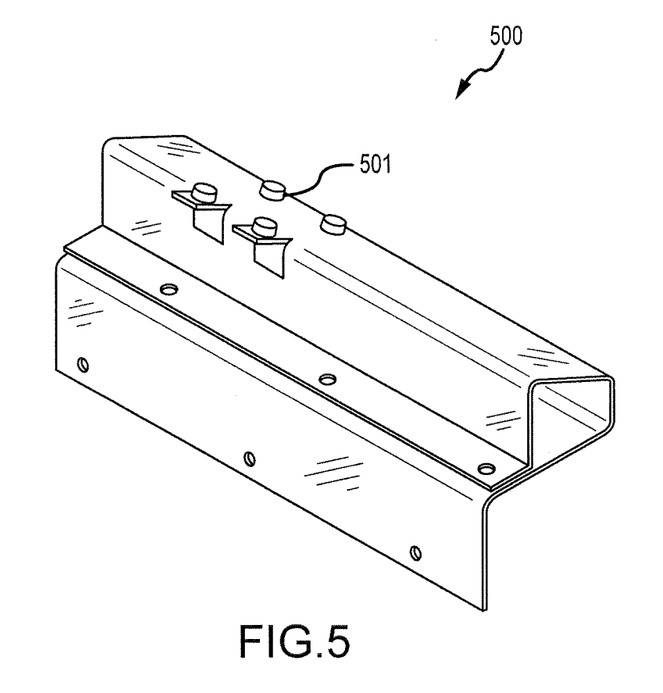
FIG. 5 illustrates various aspects of a structural support of a single aisle mount system according to various embodiments.

In various embodiments, with reference to FIG. 5, a single aisle mount system 100 may comprise a structural support 500. In various embodiments, the structural support 500 comprises a piece of sheet metal formed to interface with existing cockpit structures, for example, a window ledge. The structural support 500 may be customized for each different airframe for which the single aisle mount system 100 is utilized. In this way, the other components of a single aisle mount system 100 may be used in multiple different airframes or moved between multiple different airframes. Structural support 500 may comprise base mounts 501. In various embodiments, base mounts 501 may comprise apertures, or blind nuts, or fasteners or any other fastening apparatus configured to interface with an articulating base 300. With additional reference to FIG. 3, in various embodiments, a base plate 303 may comprise at least one affixment apparatus 311 whereby base plate 303 may mechanically interface with structural support 500 via base mounts 501.

Now, having described the various components of a single aisle mount system 100, a single aisle mount system may be installed according to various methods. With reference to FIGS. 1-6, in various embodiments, an articulating base 300 may be joined to a structural support 500, for example, via the insertion of fasteners through affixment apparatus 311 and base mounts 501. An electronic device 607 may be joined to a device mount 200, and device mount 200 may be placed atop articulating base 300 and guided into position by blind fitting tabs 309. Joiner member 350 may be inserted through apertures in device mount 200 and articulating base 300. Moreover, a single aisle mount system 100 may be oriented via annular rotation of articulation guide 301 about axis member 305, and secured in position via tightening of tightening system 320. Moreover, a single aisle mount system 100 may be oriented via rotation of upper rotation plate 603 with respect to lower rotation plate 601. In this regard, the electronic device 607 may be positioned for ease of access by the user.

Now, having described various components of single aisle mount systems and methods of installing single aisle mount systems, a single aisle mount system may be manufactured from various materials. In various embodiments, a single aisle mount system may comprise aluminum. However, in further embodiments, a single aisle mount system may comprise other metals, such as steel, titanium, tungsten, or copper, though it may further comprise numerous other materials configured to provide durability under load, for example, various plastics such as thermoplastics and various composite materials. In various embodiments, various portions of single aisle mount systems as disclosed herein are made of different materials or combinations of materials, and/or may comprise coatings.

In various embodiments, single aisle mount systems may comprise multiple materials, or any material configuration suitable to enhance or reinforce the resiliency and/or support of the system when subjected to wear in an operating environment or to satisfy other desired electromagnetic, chemical, physical, or biological properties such as mass, elasticity, conductivity, flexibility, and operating temperature range, among others.

In various embodiments, foam pads may be implemented between components of single aisle mount systems, for example, to provide vibration and/or wear dampening, and/or to provide spring force between components. For example, various pins, fasteners, articulation guide 301, base plate 303, cradle 605, and/or other system components may further comprise foam pads. As discussed herein, foam pads may be made of foam, or rubber, or plastic, or polymeric material, or any other material adapted to provide a desired resiliency and compressibility.

In various embodiments, one will appreciate in light of the present disclosure, that the single aisle mount systems described herein may be used on various applications such as, for example, vehicle operator positions, navigation systems, aircraft cockpit devices and other systems or processes. Moreover, the single aisle mount systems described herein may be employed with any electronic device in any installation. In various embodiments, the single aisle mount systems described herein are used in the context of an electronic flight bag in an aircraft cockpit. Thus, in various embodiments, the single aisle mount systems described herein provide cost effective and reliable device mounting.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A single aisle mount system comprising:
a device mount having a bent flange defining a pin acceptance aperture and having a device affixment interface adapted to mechanically interface with an electronic device;
a structural support adapted to mechanically interface with an aircraft cockpit window ledge;
a pin; and
an articulating base disposed between the device mount and the structural support, defining a pin aperture and having a blind fitting tab adapted to constrain the bent flange of the device mount such that the pin acceptance aperture and the pin aperture are aligned and each are able to receive the pin in response to the blind fitting tab interfacing with the bent flange and comprising an axis member adapted to provide an axis of rotation, wherein the articulating base retains the device mount in mechanical communication with the structural support and permits rotation of the device mount about the axis of rotation,
wherein the articulating base includes:
a base plate comprising a bent piece having two parallel flanges each defining an aperture through which the axis member is configured to extend,
an articulation guide configured to guide articulation of the device mount about the axis of rotation and having an axis aperture configured to accept the axis member and an angle stop extending outward from a center of the articulation guide and configured to contact the base plate to limit annular rotation of the articulation guide to a predetermined angle about the axis of rotation, and
a tightening system configured to exert a dampening force to prevent unwanted articulation of the device mount about the axis of rotation.

2. The system of claim 1 wherein the articulation guide further includes a first wing and an opposing second wing each defining the axis aperture and a third wing and an opposing fourth wing each defining the pin aperture and the angle stop.

3. The system of claim 1, wherein the axis member is threaded at an end and wherein the tightening system comprises a handle having threads and adapted to be threaded onto the axis member.

4. The system of claim 3, wherein the device mount further comprises a second bent flange parallel to the first bent flange and defining a second pin acceptance aperture adapted to receive the pin.

5. The system of claim 3, wherein the structural support comprises a base mount comprising a blind nut,
wherein the base plate comprises an affixment apparatus,
wherein the affixment apparatus includes an aperture, and
wherein the base mount is configured to align with the affixment apparatus such that a fastener may be inserted through the aperture into the blind nut to hold the base plate in mechanical communication with the structural support.

6. The system of claim 1, wherein the axis member comprises a carriage bolt.

7. The system of claim 4 further comprising a lanyard adapted to connect the pin to the articulating base.

8. The system of claim 1, wherein the device affixment interface defines an aperture for the insertion of a fastener.

9. The system of claim 1, wherein the device mount further comprises:
a lower rotation plate attached to the device affixment interface by fasteners;
an upper rotation plate held rotatably in mechanical communication with the lower rotation plate by at least one of a bearing and a bushing; and
a device cradle attached to the upper rotation plate.

10. The system of claim 2, wherein the base plate is made of aluminum.

11. The system of claim 1, wherein the structural support is made of aluminum.

12. A method of assembling a single aisle mount system comprising:
joining an articulating base comprising a base plate, an affixment apparatus and an articulation guide comprising a pin aperture and blind fitting tabs in mechanical communication with a structural support comprising a base mount, wherein said joining comprises inserting a fastener between the base mount and the affixment apparatus and wherein the articulation guide includes an angle stop extending outward from a center of the articulation guide and configured to contact the base plate to limit annular rotation of the articulation guide to a predetermined angle about the axis of rotation;
placing a device mount having a bent flange defining a pin acceptance aperture atop the articulating base and guiding the device mount into position with respect to the articulating base via the blind fitting tabs such that the blind fitting tab constrains the bent flange in order to align the pin acceptance aperture with the pin aperture of the articulating base;
joining the device mount to the articulating base by inserting a pin through the pin aperture and the pin acceptance aperture;
orienting the single aisle mount system via annular rotation of the articulation guide about an axis member; and
tightening a tightening system whereby the further annular rotation of the articulation guide about the axis member is prevented.

13. The method of claim 12 wherein the device mount further comprises a device cradle and the joining step further comprises placing an electronic device in the device cradle.

* * * * *